(12) United States Patent
Tang

(10) Patent No.: US 7,053,667 B1
(45) Date of Patent: May 30, 2006

(54) SINGLE WIRE DIGITAL INTERFACE

(75) Inventor: Andrew T. K. Tang, San Jose, CA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 10/937,926

(22) Filed: Sep. 10, 2004

Related U.S. Application Data

(60) Provisional application No. 60/502,499, filed on Sep. 12, 2003.

(51) Int. Cl.
*H03K 9/08* (2006.01)

(52) U.S. Cl. .............................. 327/31; 327/26; 327/37

(58) Field of Classification Search ................ 327/333, 327/175, 174, 173, 172, 38, 37, 36, 35, 34, 327/33, 31, 26

See application file for complete search history.

(56) References Cited

U.S. PATENT DOCUMENTS

| | | | |
|---|---|---|---|
| 5,210,846 A | | 5/1993 | Lee ............................. 395/425 |
| 5,491,440 A | * | 2/1996 | Uehara et al. ............... 327/172 |
| 5,737,140 A | * | 4/1998 | Carr ............................. 360/29 |
| 5,872,468 A | * | 2/1999 | Dyke ........................... 327/72 |
| 6,369,626 B1 | * | 4/2002 | Donnelly et al. ........... 327/157 |

OTHER PUBLICATIONS

Precision CMOS Single Supply Rail-to-Rail Input/Output Wideband Operational Amplifiers, AD8601/AD8602/AD8604, Rev. D, Analog Devices, Inc., Copyright 2003.

* cited by examiner

*Primary Examiner*—Quan Tra
*Assistant Examiner*—Khareem E. Almo
(74) *Attorney, Agent, or Firm*—Koppel, Patrick & Heybl

(57) ABSTRACT

A single-wire digital interface for receiving digital data as a stream of pulses, with '1' and '0' logic levels represented with pulses having "first" and "second" pulse widths, respectively. A low-pass filter produces an output that increases at a known rate for the duration of a received data pulse, and a comparator produces an output that toggles when the filter output exceeds a predetermined threshold. A clock edge is generated when a received pulse terminates; the clock and comparator outputs are provided to a latch circuit. The interface latches a '1' when the received pulse's width is equal to the "first" pulse width, and latches a '0' when the received pulse's width is equal to the "second" pulse width. Data is preferably preceded by a "start-of-packet" (SOP) bit pattern and followed with a "end-of-packet" (EOP) bit pattern.

17 Claims, 4 Drawing Sheets

SINGLE WIRE DIGITAL INTERFACE

This application claims the benefit of provisional patent application No. 60/502,499 to Tang, filed Sep. 12, 2003.

BACKGROUND OF THE INVENTION

1. Field of the Invention

This invention relates to the field of digital interfaces, and particularly to single-wire digital interfaces.

2. Description of the Related Art

A digital interface comprises circuitry designed to receive and buffer digital data, which is then made available to other circuitry. A common "3-wire" digital interface employs three inputs: DATA, CLK, and LOAD. The DATA and CLK inputs receive data and clock signals, respectively. The logic value of a data bit entered into the interface is determined by the voltage on the DATA input when the clock signal either rises or falls. The signal received at the LOAD input determines when a data word comprising a group of just-entered data bits is valid.

In some applications, a single input or "single-wire" digital interface may be desirable, such as when there are limitations on the number of available I/O pins on an integrated circuit (IC), the number of wires available to connect to an IC, or the number of drivers available to drive the interface. A single-wire interface needs to combine the functions of all three wires of a 3-wire interface. One possible single-wire approach is disclosed in U.S. Pat. No. 5,210,846 to Lee. Here, a single wire is used for bidirectional communication between a single host and either a single or multiple slave devices. The host starts communication by pulling the wire low and leaving it low for a short time t1. To write a 0, the host keeps the wire low after time t1. To write a 1, the host pulls the wire high after time t1. To read, the host releases control of the wire after time t1 and allows the slave to pull it low to send a 0, or leave it floating; if the slave leaves it floating then an external resistor pulls the wire high to send a 1. After a minimum predefined time t2 after time t1, the host can pull the wire high to prepare for the next communication bit. A command word at the start of each transfer defines the transfer type.

However, Lee's system requires a large number of components, and therefore may require an unacceptably large amount of space on an IC die and consume an excessive amount of current.

SUMMARY OF THE INVENTION

A single-wire digital interface is presented which overcomes the problems noted above, employing a concise implementation which is simple to use and requires only a small die area.

The present single-wire digital interface is suitable for receiving digital data as a stream of pulses, with '1' and '0' logic levels represented with pulses having first and second pulse widths, respectively. The interface includes an input node for receiving the stream of data pulses. A low-pass filter connected to the input node produces an output that increases at a known rate for the duration of a received pulse, and a comparator produces an output that toggles when the low-pass filter output exceeds a predetermined threshold. A clock generator outputs a clock pulse when a received data pulse terminates; the clock and comparator outputs are provided to a latch. The low-pass filter, comparator and latch are arranged such that a '1' logic level is latched when the pulse width of a received pulse is about equal to the first pulse width, and a '0' logic level is latched when a received pulse has a pulse width about equal to the second pulse width. Thus, if first and second pulse widths are defined as, e.g., >50 μs and <10 μs, respectively, a narrow pulse (<10 μs) applied at the input node results in the latching of a logic '0', and a wide pulse (>50 μs) results in the latching of a logic '1'.

The present digital interface is preferably arranged such that a b-bit sequence of data bits is preceded by a predetermined a-bit "start-of-packet" (SOP) bit pattern, and is followed with a predetermined c-bit "end-of-packet" (EOP) bit pattern. When so arranged, the interface also includes a SOP bit pattern detector arranged to compare a sequence of a consecutive latched bits with the predetermined SOP bit pattern to detect the beginning of a sequence of data bits, and an EOP bit pattern detector arranged to compare a sequence of c consecutive latched bits with the predetermined EOP bit pattern to detect the end of a sequence of data bits.

Further features and advantages of the invention will be apparent to those skilled in the art from the following detailed description, taken together with the accompanying drawings.

BRIEF DESCRIPTION OF THE DRAWINGS

FIG. 1b is a timing diagram illustrating the operation of the interface of FIG. 1a.

FIG. 2b is a timing diagram illustrating the operation of the interface of FIG. 2a.

DETAILED DESCRIPTION OF THE INVENTION

Figure 1A:
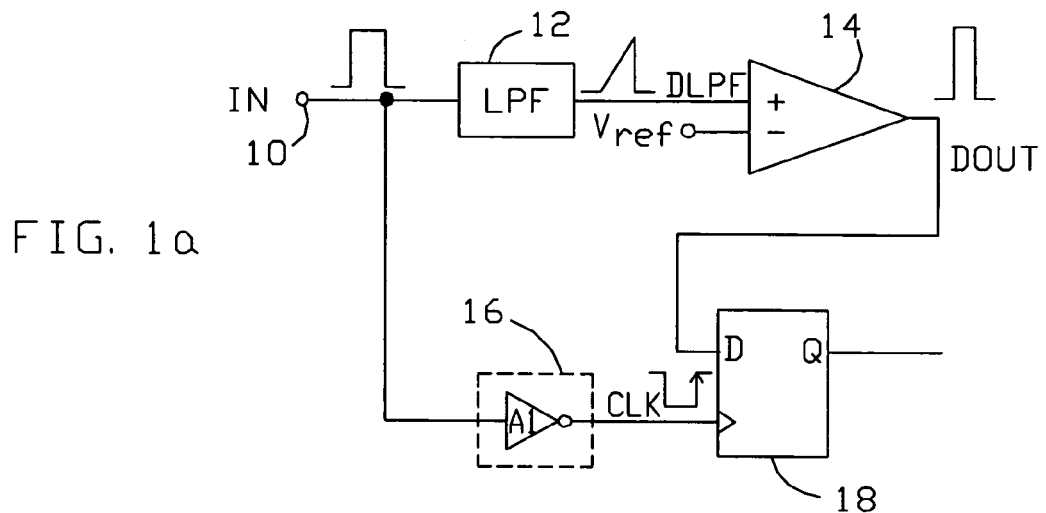
FIG. 1a is a schematic diagram of a single-wire digital interface per the present invention.

A diagram illustrating the operation of the present single-wire digital interface is shown in FIG. 1a. The interface is arranged to receive digital data as a stream of pulses, with '1' and '0' logic levels represented with pulses having defined "first" and "second" pulse widths, respectively. The interface comprises an input node 10 which receives the digital data pulses. The received pulses are applied to the input of a low-pass filter 12, which produces an output DLPF that increases at a known rate for the duration of a received pulse. Signal DLPH is applied to an input of a comparator 14, the output of which (DOUT) toggles when DLPH exceeds a predetermined threshold (represented here as an external reference $V_{ref}$, though an internal reference might also be used). A clock generator 16, here implemented with an inverter A1, is connected to input node 10 and produces a clock signal CLK having an edge when a received pulse terminates. Clock signal CLK and comparator output signal DOUT are provided to the data and clock inputs, respectively, of a latch 18, represented here as a D-type flip-flop, which is arranged to latch a signal at its 'D' input upon the occurrence of a rising edge on its 'CLK' input. (Note that latch 18 might alternatively be arranged to latch on a falling edge, and clock generator 16 arranged such that CLK has a falling edge when a received pulse terminates).

Figure 1B:
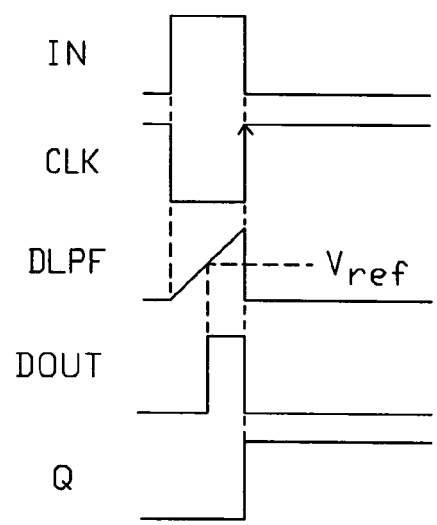

A timing diagram illustrating the operation of the present digital interface is shown in FIG. 1b. Clock signal CLK is the inverse of the received input pulse IN. The output DLPF of low-pass filter 12 increases as long as IN is a logic '1'. If the duration of the input pulse is wide enough, DLPF will eventually exceed threshold $V_{ref}$, causing DOUT to become a logic '1'. Then, when input pulse IN terminates (i.e., toggles from '1' to '0' in this example), a rising edge of CLK is applied to the clock input of latch 18, which latches DOUT. Since DOUT is a '1' when CLK goes high, the latch output (Q) becomes a '1'.

Low-pass filter 12, comparator 14 and latch 18 are arranged such that a logic '1' is latched when a received pulse has a duration about equal to the "first" pulse width, and such that a logic '0' is latched when a received pulse has a duration about equal to the "second" pulse width.

The "first" and "second" pulse widths are preferably defined as respective ranges. For example, the "first" and "second" pulse widths may be defined as being >50 μs and <10 μs, respectively. Low-pass filter 12 and comparator 14 would then be arranged such that a received pulse having a duration of >50 μs causes DLPF to increase enough to make comparator output DOUT high (such that a logic '1' is latched), and such that a received pulse having a duration of <10 μs results in a DLPF too low to make comparator output DOUT toggle (such that a logic '0' is latched).

Note that it is not essential that a logic '0' be defined as having the narrower pulse width and that a logic '1' have the wider pulse width; the interface would perform equally well if a logic '0' and a logic '1' were defined as the wider and narrower pulse widths, respectively.

Figure 2A:
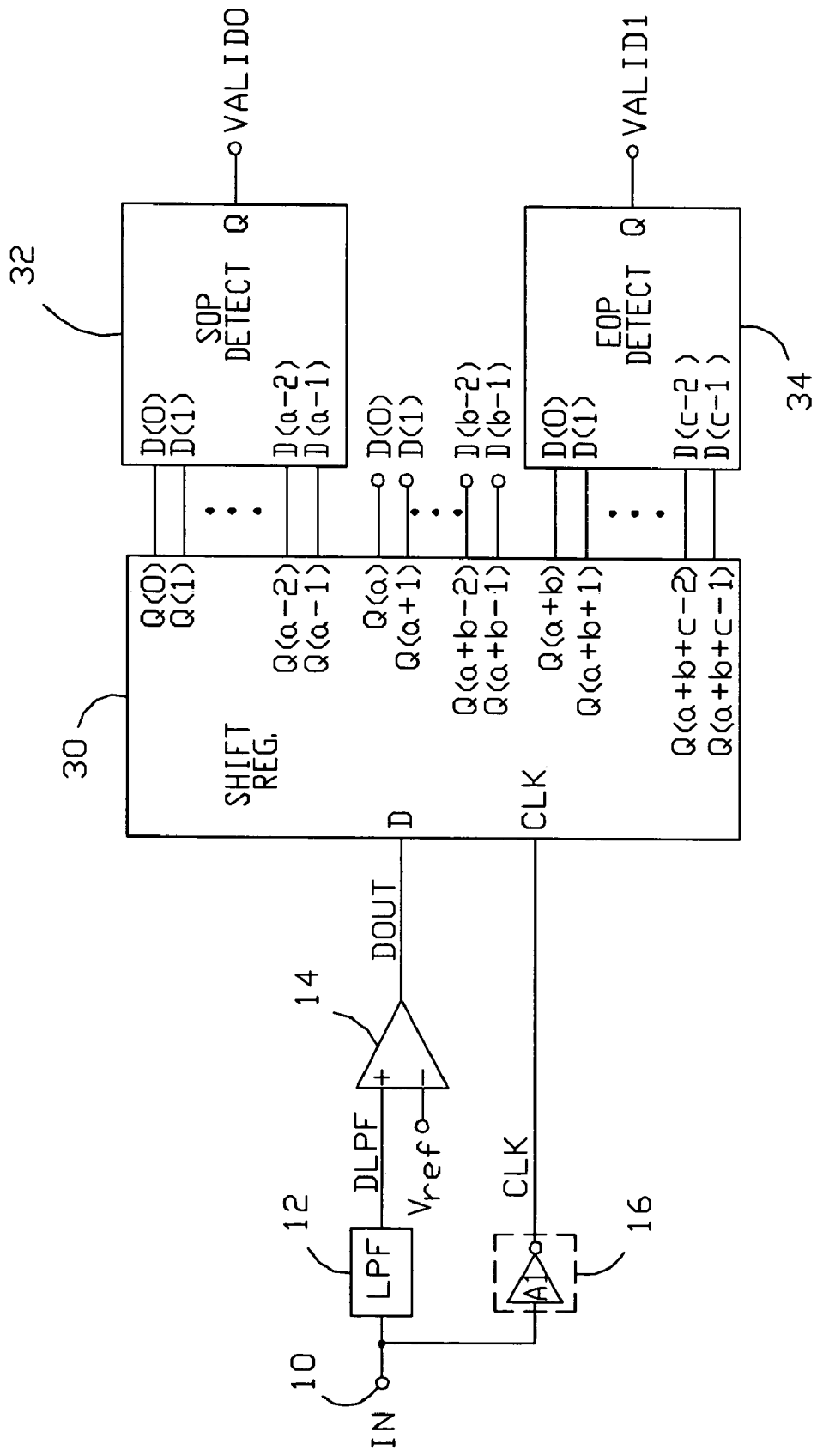
FIG. 2a is a schematic diagram of a preferred embodiment of a single-wire digital interface per the present invention.

Digital data is often conveyed by way of "data packets", each of which typically includes a digital word which is preceded by a predetermined start-of-packet (SOP) bit pattern and is followed by a predetermined end-of-packet (EOP) bit pattern. A practical embodiment of the present invention designed for receiving such data packets is shown in FIG. 2a. Here, the digital interface employs a shift register 30 as the invention's latch element, a SOP detect circuit 32, and an EOP detect circuit 34. The interface operates as before, except that comparator output signal DOUT is clocked into shift register 30 at the termination of every input pulse. In this example, the digital interface is defined such that data is conveyed to input node 10 as digital words b bits in length. Each digital word is preceded with a predetermined SOP bit pattern that is a bits in length, and is followed by a predetermined EOP bit pattern that is c bits in length. Thus, the first a bits of the shift register (Q(0) to Q(a−1)) are provided to SOP detect circuit 32, the next b bits of the shift register (Q(a) to Q(a+b−1)) are the digital word's data bits (D(0) to D(b−1)), and the last c bits of the shift register (Q(a+b) to Q(a+b+c−1)) are provided to EOP detect circuit 34. SOP detect circuit 32 compares the first a bits of shift register 30 with the predefined SOP bit pattern, and sets its output (VALID0) "true" when the bits match. Similarly, EOP detect circuit 34 compares the last c bits of shift register 30 with the predefined EOP bit pattern, and sets its output (VALID1) "true" when the bits match. The digital word's b data bits are recognized as valid only when both VALID0 and VALID1 are true.

Figure 2B:
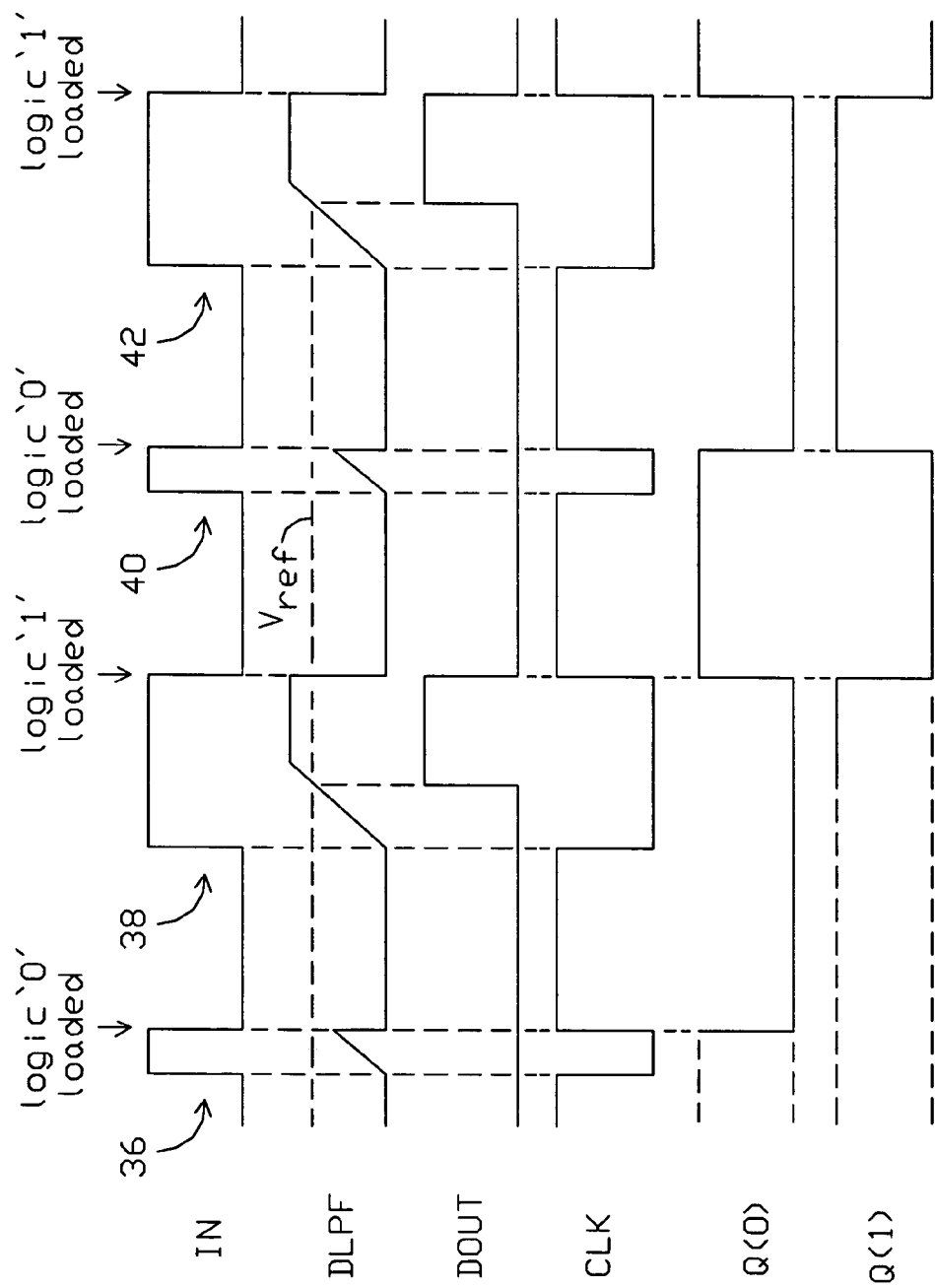

A timing diagram illustrating the operation of the digital interface shown in FIG. 2a is shown in FIG. 2b; the contents of shift register 30 are assumed to be unknown initially. In, this example, a logic '0' is defined as a narrow pulse, and a logic '1' is defined as a wide pulse. A '0' pulse 36 causes DLPF to increase, but when pulse 36 terminates and CLK toggles high, DLPF has not increased to $V_{ref}$ and thus a logic '0' is loaded into shift register 30. The next input pulse 38 is wide, such that DLPF exceeds $V_{ref}$ by the time the input pulse terminates and CLK toggles high, thereby loading a logic '1' into shift register 30. The interface performs similarly for the next two input pulses: a logic '0' (40) and a logic '1' (42).

When an IC containing a shift register is powered up, the contents of the shift register are normally undefined. This can lead to undesirable behavior at power-up, since the shift register contents could be recognized as valid SOP and/or EOP bit patterns. To prevent this, a power-on reset circuit (not shown) is preferably used to reset the shift register at power-up. Such circuits are well known.

The length b of the digital data words must be carefully considered. If b≧a or b≧c, a digital data word might be falsely detected as a SOP or EOP bit pattern. For example, if the SOP bit pattern is the 6-bit word 100001, and an incoming digital data word is an 8-bit sequence 11100001, the last 6 bits of the data word would be incorrectly detected as a SOP bit pattern when loaded into the shift register. For this reason, it is preferred that the length b of the digital data words provided to the present interface be shorter than either the predefined SOP or EOP bit patterns, to prevent a data word from being falsely detected as an SOP or EOP pattern.

However, if b≧a or b≧c, the incoming digital words can be broken up into smaller data fields, with one or more dummy bits separating the data fields. The dummy bits should be chosen so that no data pattern can be falsely detected as a SOP or EOP bit pattern. The incoming digital data word in the example above could be, for example, split into two 4-bit words with a single dummy bit separator: 1110 1 0001. When so arranged, no data sequence which includes the dummy '1' bit will trigger a SOP bit pattern.

Figure 3:
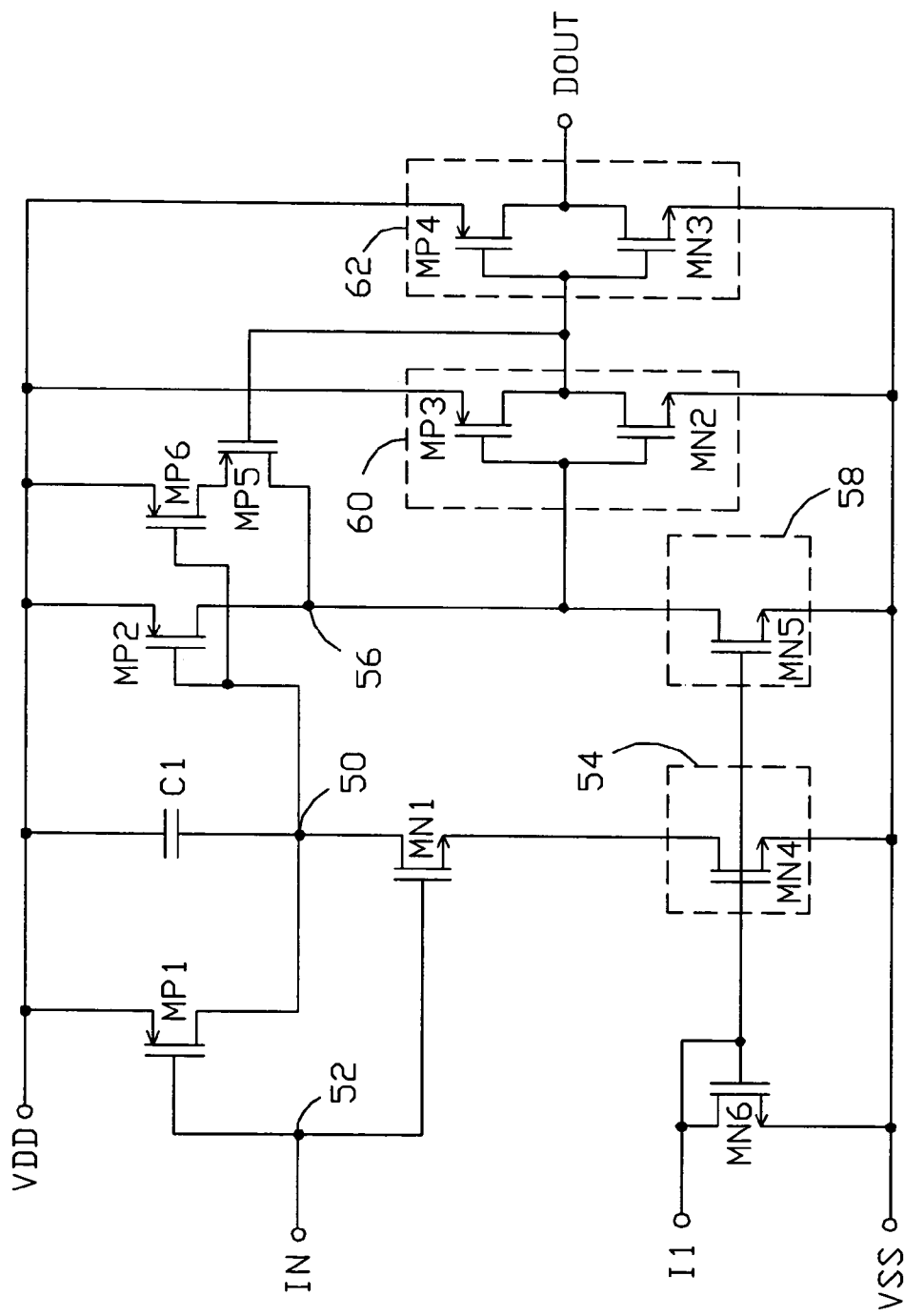
FIG. 3 is a schematic diagram of a preferred embodiment of a low-pass filter and comparator as might be used by the present invention.

A preferred embodiment of a low-pass filter and comparator as might be used with the present invention is shown in FIG. 3. A capacitor C1 is connected between a supply voltage VDD and a node 50. A P-type field-effect transistor (FET) MP1 has its drain-source circuit connected between VDD and node 50, and its gate connected to the interface's input node 52. An N-type FET MN1 has its drain-source circuit connected between node 50 and a current source 54, and its gate connected to input node 52. Node 50 is connected to the gate of a P-type FET MP2, the drain-source circuit of which is connected between VDD and a node 56. Node 56 is also connected to a current source 58. Node 56 is preferably connected to the input of an inverter 60, comprising FETs MP3 and MN2. Another inverter 62, comprising FETs MP4 and MN3, inverts the output of inverter 60 to produce output DOUT.

The low-pass filter and comparator operate as follows: assume that C1 is initially discharged. When an input pulse IN is received at input node 52 (i.e., goes "high"), MN1 is turned on and allows current from current source 54 to charge C1. This causes the voltage at node 50—and thus the gate of MP2—to decrease. If the duration of the input pulse is sufficiently long, MP2 eventually pulls node 56 high enough to cause the output of inverter 60 to go low, and the output (DOUT) of inverter 62 to go high.

When an input pulse terminates, MP1 is turned on and discharges C1. This causes the voltage at node 50 to increase and turn MP2 off, causing the output of inverter 60 to go high and the output (DOUT) of inverter 62 to go low.

Current sources 54 and 58 are preferably implemented with respective transistors MN4 and MN5, which mirror a current I1 provided to a diode-connected transistor MN6 to MN1 and node 56, respectively. Current I1 is preferably constant with temperature and supply voltage.

A number of circuit elements may be manipulated to provide desired definitions for the interface's '1' and '0' logic levels. For example, the size of C1 and the relative sizes of MN1, MN4, MN5 and MP2 each help determine which input pulse widths will be interpreted as a '0' and which will be interpreted as a '1'.

The circuit preferably includes a transistor MP5, which is turned on and provides current to node 56 when the output of inverter 60 goes low. By so doing, MP5 introduces hysteresis to the voltage at node 56, which helps to prevent spurious signals at output node DOUT. A transistor MP6 is preferably connected in series with MP5, to define the current through MP5.

To give the circuit some insensitivity to temperature, MP2 can be sized such that its gate-source voltage is roughly constant with temperature when the output of inverter 60 trips. Then, the decrease of MP2's threshold voltage with temperature will be roughly balanced by the $V_{D,sat}$ increase with temperature for the current supplied by MN5.

The time period for which input pulse IN is low is unimportant; therefore, the size of MP1 is not critical. C1 must be discharged slowly enough so that the shift register of FIG. 2a can load a valid logic signal when IN goes from high to low, but quickly enough so that the time needed for C1 to discharge is not excessive. As an example, the low-pass filter and comparator of FIG. 3 could be designed such that DOUT is high when IN is high for 22 μs or more. If a logic '0' is defined as a pulse having a duration of <10 μs and a logic '1' defined as a pulse having a duration of >50 μs, this gives a margin of 2.2 in either direction for manufacturing and temperature variations.

Note that, though the low-pass filter and comparator implementation shown in FIG. 3 is preferred, these circuit functions could be implemented in many different ways.

While particular embodiments of the invention have been shown and described, numerous variations and alternate embodiments will occur to those skilled in the art. Accordingly, it is intended that the invention be limited only in terms of the appended claims.

I claim:

1. A single-wire digital interface for receiving digital data as a stream of pulses, with '1' and '0' logic levels represented with pulses having defined "first" and "second" pulse widths, respectively, comprising:
   an input node for receiving said stream of pulses;
   a low-pass filter arranged to produce an output that increases from an initial minimum value at a known rate for the duration of a single pulse received at said input node and returns to said initial minimum value when said single pulse terminates;
   a comparator which produces an output that toggles from a logic '0' to a logic '1' when said low-pass filter output exceeds a first predetermined threshold;
   a clock generator arranged to output a clock signal which has an edge having a first polarity when each pulse received at said input node terminates; and
   a latch which receives said comparator output and said clock generator output at respective inputs and which latches said comparator output upon receipt of a clock edge having said first polarity;
   said low-pass filter and comparator arranged such that said latch latches a logic '1' when a pulse received at said input node has a pulse width about equal to said "first" pulse width, and such that said latch latches a logic '0' when a pulse received at said input node has a pulse width about equal to said second pulse width.

2. The digital interface of claim 1, wherein said "first" and "second" pulse widths are defined as respective ranges, said low-pass filter and comparator arranged such that said latch latches a logic '1' when the duration of a pulse received at said input node is within said "first" pulse width's defined range, and such that said latch latches a logic '0' when the duration of a pulse received at said input node is within said "second" pulse width's defined range.

3. The digital interface of claim 2, wherein said first pulse width is defined as >x μs, and said second pulse width is defined as <y μs, where x>y.

4. The digital interface of claim 2, wherein said second pulse width is defined as >x μs, and said first pulse width is defined as <y μs, where x>y.

5. A single-wire digital interface for receiving digital data as a stream of pulses, with '1' and '0' logic levels represented with pulses having defined "first" and "second" pulse widths, respectively, comprising:
   an input node for receiving said stream of pulses;
   a low-pass filter arranged to produce an output that increases at a known rate for the duration of a pulse received at said input node;
   a comparator which produces an output that toggles from a logic '0' to a logic '1' when said low-pass filter output exceeds a first predetermined threshold;
   a clock generator arranged to output a clock signal which has an edge having a first polarity when a pulse received at said input node terminates; and
   a latch which receives said comparator output and said clock generator output at respective inputs and which latches said comparator output upon receipt of a clock edge having said first polarity;
   said low-pass filter and comparator arranged such that said latch latches a logic '1' when a pulse received at said input node has a pulse width about equal to said "first" pulse width, and such that said latch latches a logic '0' when a pulse received at said input node has a pulse width about equal to said second pulse width;
   wherein said latch comprises a shift register, said comparator output entered into said shift register when said clock generator outputs a clock edge having said first polarity.

6. A single-wire digital interface for receiving digital data as a stream of pulses, with '1' and '0' logic levels represented with pulses having defined "first" and "second" pulse widths, respectively, comprising:
   an input node for receiving said stream of pulses;
   a low-pass filter arranged to produce an output that increases at a known rate for the duration of a pulse received at said input node;
   a comparator which produces an output that toggles from a logic '0' to a logic '1' when said low-pass filter output exceeds a first predetermined threshold;
   a clock generator arranged to output a clock signal which has an edge having a first polarity when a pulse received at said input node terminates; and
   a latch which receives said comparator output and said clock generator output at respective inputs and which latches said comparator output upon receipt of a clock edge having said first polarity;
   said low-pass filter and comparator arranged such that said latch latches a logic '1' when a pulse received at said input node has a pulse width about equal to said "first" pulse width, and such that said latch latches a logic '0' when a pulse received at said input node has a pulse width about equal to said second pulse width;
   wherein data is received at said input node in data packets, each of said packets comprising a b-bit digital word preceded by a predetermined a-bit "start-of-packet" (SOP) bit pattern, said interface further comprising a SOP bit pattern detector arranged to compare a sequence of a consecutive latched bits with said predetermined SOP bit pattern to detect the beginning of a data packet.

7. A single-wire digital interface for receiving digital data as a stream of pulses, with '1' and '0' logic levels represented with pulses having defined "first" and "second" pulse widths, respectively, comprising:
- an input node for receiving said stream of pulses;
- a low-pass filter arranged to produce an output that increases at a known rate for the duration of a pulse received at said input node;
- a comparator which produces an output that toggles from a logic '0' to a logic '1' when said low-pass filter output exceeds a first predetermined threshold;
- a clock generator arranged to output a clock signal which has an edge having a first polarity when a pulse received at said input node terminates; and
- a latch which receives said comparator output and said clock generator output at respective inputs and which latches said comparator output upon receipt of a clock edge having said first polarity;
- said low-pass filter and comparator arranged such that said latch latches a logic '1' when a pulse received at said input node has a pulse width about equal to said "first" pulse width, and such that said latch latches a logic '0' when a pulse received at said input node has a pulse width about equal to said second pulse width;
- wherein data is received at said input node in data packets, each of said packets comprising a b-bit digital word followed by a predetermined c-bit "end-of-packet" (EOP) bit pattern, said interface further comprising an EOP bit pattern detector arranged to compare a sequence of c consecutive latched bits with said predetermined EOP bit pattern to detect the end of a data packet.

8. A single-wire digital interface for receiving digital data as a stream of pulses, with '1' and '0' logic levels represented with pulses having defined "first" and "second" pulse widths, respectively, comprising:
- an input node for receiving said stream of pulses;
- a low-pass filter arranged to produce an output that increases at a known rate for the duration of a pulse received at said input node;
- a comparator which produces an output that toggles from a logic '0' to a logic '1' when said low-pass filter output exceeds a first predetermined threshold;
- a clock generator arranged to output a clock signal which has an edge having a first polarity when a pulse received at said input node terminates; and
- a latch which receives said comparator output and said clock generator output at respective inputs and which latches said comparator output upon receipt of a clock edge having said first polarity;
- said low-pass filter and comparator arranged such that said latch latches a logic '1' when a pulse received at said input node has a pulse width about equal to said "first" pulse width, and such that said latch latches a logic '0' when a pulse received at said input node has a pulse width about equal to said second pulse width;
- wherein data is received at said input node in data packets, each of said packets comprising a b-bit digital word preceded by a predetermined a-bit "start-of-packet" (SOP) bit pattern and followed by a predetermined c-bit "end-of-packet" (EOP) bit pattern, said interface further comprising:
- a SOP bit pattern detector arranged to compare a sequence of a consecutive latched bits with said predetermined SOP bit pattern to detect the beginning of a data packet; and
- an EOP bit pattern detector arranged to compare a sequence of c consecutive latched bits with said predetermined EOP bit pattern to detect the end of a data packet.

9. The digital interface of claim 8, wherein said digital interface is arranged such that b<a and b<c.

10. The digital interface of claim 8, wherein said digital interface is arranged such that b>a and b>c, said digital interface further arranged such that each b-bit digital word is segmented into two or more data fields separated with one or more dummy bits, the number of bits in each of said data fields being less than a and less than c such that no b-bit digital word is falsely detected as an SOP or EOP bit pattern.

11. A single-wire digital interface for receiving digital data as a stream of pulses, with '1' and '0' logic levels represented with pulses having defined "first" and "second" pulse widths, respectively, comprising:
- an input node for receiving said stream of pulses;
- a low-pass filter arranged to produce an output that increases at a known rate for the duration of a pulse received at said input node;
- a comparator which produces an output that toggles from a logic '0' to a logic '1' when said low-pass filter output exceeds a first predetermined threshold;
- a clock generator arranged to output a clock signal which has an edge having a first polarity when a pulse received at said input node terminates; and
- a latch which receives said comparator output and said clock generator output at respective inputs and which latches said comparator output upon receipt of a clock edge having said first polarity;
- said low-pass filter and comparator arranged such that said latch latches a logic '1' when a pulse received at said input node has a pulse width about equal to said "first" pulse width, and such that said latch latches a logic '0' when a pulse received at said input node has a pulse width about equal to said second pulse width;
- wherein said low-pass filter and comparator comprise:
  - a capacitor connected between a supply voltage and a first node;
  - a first transistor having a control input and a current circuit, said current circuit connected between said first node and said supply voltage;
  - a first current source which outputs a first current;
  - a second transistor having a control input and a current circuit, said current circuit connected between said first node and said first current source, the control inputs of said first and second transistors connected to said input node, said capacitor and said first and second transistors arranged such that said second transistor is turned on and said capacitor is charged by said first current when said input node is at a logic '1', and such that said first transistor is turned on and said capacitor is discharged when said input node is at a logic '0';
  - a third transistor having a control input and a current circuit, said current circuit connected between said supply voltage and a second node, the control input of said third transistor connected to said first node; and
  - a second current source which outputs a second current connected to said second node, said third transistor and said second current source arranged such that said third transistor pulls up said second node when the voltage between said supply voltage and said first node exceeds a second predetermined threshold that varies with said first predetermined threshold, and such that said second current source pulls down said second node when the voltage between said supply voltage and said first node is less than said second predetermined threshold.

12. The digital interface of claim 11, further comprising a hysteresis circuit arranged to further pull up said second node when said third transistor pulls up said second node.

13. The digital interface of claim 12, wherein said hysteresis circuit comprises:
   an inverter having its input connected to said second node; and
   a fourth transistor having a control input and a current circuit, said fourth transistor's control input connected to the output of said inverter and its current circuit connected between said supply voltage and said second node such that said fourth transistor conducts a current to said second node when said third transistor pulls up said second node and the output of said inverter goes "low".

14. The digital interface of claim 11, wherein said first and second current sources comprise:
   a third node which receives a reference current;
   a fourth transistor which is diode-connected and connected to conduct said reference current;
   a fifth transistor connected to mirror the current conducted by said fourth transistor to provide said first current; and
   a sixth transistor connected to mirror the current conducted by said fourth transistor to provide said second current.

15. The digital interface of claim 1, wherein said clock generator comprises an inverter having its input connected to said input node.

16. A single-wire digital interface for receiving digital data as a stream of pulses, with '1' and '0' logic levels represented with pulses having "first" and "second" pulse widths, respectively, said first and second pulse widths defined as respective ranges, said digital data received at said input node in data packets, each of said packets comprising a b-bit digital word preceded by a predetermined a-bit "start-of-packet" (SOP) bit pattern and followed by a predetermined c-bit "end-of-packet" (EOP) bit pattern, said digital interface comprising:
   an input node for receiving said stream of pulses;
   a low-pass filter arranged to produce an output that increases at a known rate for the duration of a pulse received at said input node;
   a comparator which produces an output that toggles from a logic '0' to a logic '1' when said low-pass filter output exceeds a said first predetermined threshold;
   a clock generator having its input connected to said input node such that it outputs a high-going clock edge when a pulse received at said input node terminates; and
   a shift register which receives said comparator output and said clock generator output at respective inputs and which enters said comparator output upon receipt of a high-going clock edge;
   said low-pass filter, comparator and shift register arranged such that said shift register enters a logic '1' when the duration of a pulse received at said input node is within said "first" pulse width's range, and such that said shift register enters a logic '0' when the duration of a pulse received at said input node is within said "second" pulse width's range;
   a SOP bit pattern detector arranged to compare a sequence of a consecutive entered bits with said predetermined SOP bit pattern to detect the beginning of a data packet; and
   an EOP bit pattern detector arranged to compare a sequence of c consecutive entered bits with said predetermined EOP bit pattern to detect the end of a data packet.

17. The digital interface of claim 16, wherein said low-pass filter and comparator comprise:
   a capacitor connected between a supply voltage and a first node;
   a first transistor having a control input and a current circuit, said current circuit connected between said first node and said supply voltage;
   a first current source which outputs a first current;
   a second transistor having a control input and a current circuit, said current circuit connected between said first node and said first current source, the control inputs of said first and second transistors connected to said input node, said capacitor and said first and second transistors arranged such that said second transistor is turned on and said capacitor is charged by said first current when said input node is at a logic '1', and such that said first transistor is turned on and said capacitor is discharged when said input node is at a logic '0';
   a third transistor having a control input and a current circuit, said current circuit connected between said supply voltage and a second node, the control input of said third transistor connected to said first node;
   a second current source which outputs a second current connected to said second node, said third transistor and said second current source arranged such that said third transistor pulls up said second node when the voltage between said power voltage and said first node exceeds a second predetermined threshold that varies with said first predetermined threshold, and such that said second current source pulls down said second node when the voltage between said power voltage and said first node is less than said second predetermined threshold.

* * * * *